United States Patent [19]

Henry et al.

[11] Patent Number: 5,101,001
[45] Date of Patent: Mar. 31, 1992

[54] POLYURETHANE-FORMING FOUNDRY BINDERS AND THEIR USE

[75] Inventors: Colleen M. Henry; Richard L. Smith, both of Dublin, Ohio

[73] Assignee: Ashland Oil, Inc., Russell, Ky.

[21] Appl. No.: 454,616

[22] Filed: Dec. 21, 1989

[51] Int. Cl.$^5$ .......................... C08G 8/04; B22C 1/22; C08F 283/00
[52] U.S. Cl. .................................... 528/139; 523/142; 525/480; 528/162
[58] Field of Search ................ 523/142; 528/162, 139; 525/480

[56] References Cited

U.S. PATENT DOCUMENTS 3,676,392  7/1972  Robins .................................. 528/139
4,293,480  10/1981  Martin et al. ....................... 523/142

Primary Examiner—Maurice J. Welsh
Assistant Examiner—T. Mosley
Attorney, Agent, or Firm—David L. Hedden

[57] ABSTRACT

This invention relates to no-bake foundry binders and a no-bake process for preparing foundry shapes which utilizes polyurethane-forming foundry binders. The binders are unique because the isocyanate component preferably contains no solvent and the weight ratio of the phenolic resin component to isocyanate component is atypical. It has been found that the use of these binders in a no-bake process produces foundry shapes with improved tensile strengths.

42 Claims, No Drawings

POLYURETHANE-FORMING FOUNDRY BINDERS AND THEIR USE

TECHNICAL FIELD

This invention relates to polyurethane-forming foundry binders and their use. The binders are unique because the isocyanate component preferably contains no solvent and the weight ratio of the phenolic resin component to isocyanate component is atypical. It has been found that the use of these binders in a no-bake process produces foundry shapes with improved tensile strengths.

BACKGROUND OF THE INVENTION

In the foundry industry, one of the procedures used for making metal parts is by sand casting. In sand casting, disposable molds and cores are fabricated with a mixture of sand and an organic or inorganic binder. The binder is usually used to strengthen the cores, which are the most fragile part of the mold assembly.

One of the fabrication processes used in sand casting is the no-bake process. In this process a liquid curing agent is mixed with the sand and binder to cure the mixture. Generally, the foundry shapes are large and several minutes of worktime is needed for shaping.

A binder commonly used in the no-bake fabrication process is a polyurethane binder derived from curing a polyurethane-forming binder composition with a liquid tertiary amine catalyst. The polyurethane-forming binder composition usually consists of a phenolic resin component and polyisocyanate hardener component. Both the phenolic resin component and the polyisocyanate component typically contain substantial amounts of solvents, i.e. 20 to 40 percent by weight. Although solvent selection depends upon the goals of the formulator and can require a great deal of experimentation to optimize a formulation, esters, aromatics, and non polar solvents are generally used as the solvents.

U.S. Pat. No. 3,676,392 describes a no-bake binder which has been successfully used on a commercial scale. Such polyurethane-forming binder compositions, used in the no-bake process, have proven satisfactory for casting such metals as iron or steel which are normally cast at temperatures exceeding about 2500 degrees Fahrenheit.

SUMMARY OF THE INVENTION

This invention relates to polyurethane-forming foundry binders used for the fabrication of foundry shapes which cure in the presence of a catalytically effective amount of an amine catalyst and which comprise:

(a) a phenolic resole resin component comprising a phenolic resin and from 40-60 weight percent of a co-solvent mixture wherein said weight percent is based upon the total weight of the resin component, and wherein said co-solvents are a mixture of an ester solvent and an aromatic solvent such that the weight ratio of aromatic solvent to ester solvent is from 3:1 to 1:1; and (b) an isocyanate component comprising an organic polyisocyanate and from 0–15 weight percent of a solvent, said weight percent based upon the total weight of the isocyanate component, such that the weight ratio of (a) to (b) is from 65:35 to 75:25, preferably 70:30.

The invention also relates to foundry mixes prepared by mixing the binder with a foundry aggregate. It also relates to fabricating foundry shapes from the foundry mix, particularly by a no-bake process Foundry shapes prepared with the subject binders by a no-bake process have improved tensile strength.

BEST MODE AND OTHER MODES FOR PRACTICING THE INVENTION

The phenolic resole resin component comprises a resole phenolic resin and a solvent as specified. It may also contain various optional ingredients such as adhesion promoters, and release agents.

The resole phenolic resin is prepared by reacting an excess of aldehyde with a phenol in the presence of either an alkaline catalyst or a divalent metal catalyst according to methods well known in the art.

The preferred phenolic resins used to form the subject binder compositions are well known in the art, and are specifically described in U.S. Pat. No. 3,485,797 which is hereby incorporated by reference.

These preferred resins are the reaction products of an aldehyde with a phenol. They contain a preponderance of bridges joining the phenolic nuclei of the polymer which are ortho-ortho benzylic ether bridges. They are prepared by reacting an aldehyde and a phenol in a mole ratio of aldehyde to phenol of at least 1:1, generally from 1.1:1.0 to 3.0:1.0 and preferably from 1.5:1.0 to 1.0:1.0, in the presence of a metal ion catalyst, preferably a divalent metal ion such as zinc, lead, manganese, copper, tin, magnesium, cobalt, calcium, and barium.

The phenols may be represented by the following structural formula:

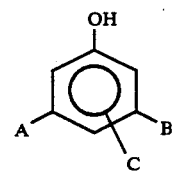

wherein A, B, and C are hydrogen atoms, or hydroxyl radicals, or hydrocarbon radicals or oxyhydrocarbon radicals, or halogen atoms, or combinations of these.

The phenol may be a multiple ring phenol such as bisphenol A. The phenolic resin is preferably non-aqueous. By "non-aqueous" is meant a phenolic resin which contains water in amounts of no more than about 10%, preferably no more than about 1% based on the weight of the resin. The phenolic resin component preferably includes benzylic ether resins.

The aldehyde has the formula R'CHO wherein R' is a hydrogen or hydrocarbon radical of 1 to 8 carbon atoms.

By "phenolic resin" is meant the reaction product of a phenol with an aldehyde in which the final mixture of molecules in the reaction products is dependent upon the specific reactants selected, the starting ratio of these reactants, and the conditions of the reaction (for example, the type of catalyst, the time and temperature of the reaction, the solvents, and/or other ingredients present, and so forth). The reaction products, that is the phenolic resin, will be a mixture of different molecules and may contain in widely varying ratios addition products, condensation products, and unreacted reactants such as unreacted phenol and/or unreacted aldehyde.

By "addition product" is meant reaction products in which an organic group has been substituted for at least one hydrogen of a previously unreacted phenol or of a condensation product.

By "condensation product" is meant reaction products that link two or more aromatic rings.

The phenolic resins are substantially free of water and are organic solvent soluble. The phenolic component includes any one or more of the phenols which have heretofore been employed in the formation of phenolic resins and which are not substituted at either the two ortho-positions or at one ortho-position and the para-position such as unsubstituted positions being necessary for the polymerization reaction. Any one, all, or none of the remaining carbon atoms of the phenol ring can be substituted. The nature of the substituent can vary widely and it is only necessary that the substituent not interfere in the polymerization of the aldehyde with the phenol at the ortho-position and/or para-position. Substituted phenols employed in the formation of the phenolic resins include alkyl-substituted phenols, aryl-substituted phenols, cyclo-alkyl-substituted phenols, aryloxy-substituted phenols, and halogen-substituted phenols, the foregoing substituents containing from 1 to 26 carbon atoms and preferably from 1 to 12 carbon atoms.

Specific examples of suitable phenols include phenol, 2,6-xylenol, o-cresol, p-cresol, 3,5-xylenol, 3,4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Multiple ring phenols such as bisphenol A are also suitable. Such phenols can be described by the general formula:

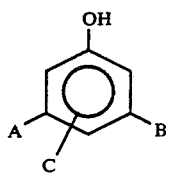

wherein A, B, and C are hydrogen atoms, or hydroxyl radicals, or hydrocarbon radicals, or oxyhydrocarbon radicals, or halogen atoms, or combinations of these.

The phenol reactant is preferably reacted with an aldehyde to form phenolic resins and more preferably benzylic ether resins. The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The phenolic resin used must be liquid or organic solvent-suitable. Solubility in an organic solvent is desirable to achieve uniform distribution of the binder on the aggregate.

The substantial absence of water in the phenolic resin is desirable in view of the reactivity of the binder composition of the present invention with water. Mixtures of phenolic resins can be used.

Alkoxy-modified phenolic resins may also be used as the phenolic resin. These phenolic resins are prepared in essentially the same way as the unmodified phenolic resins previously described except a lower alkyl alcohol is reacted with the phenol and aldehyde or reacted with an unmodified phenolic resin.

In addition the phenolic resin, the phenolic resin component of the binder composition also contains at least one organic solvent in amount such that the solvent is from 40 to 60 weight percent of total weight of the phenolic resin component. The organic solvents which are used with the phenolic resin in the phenolic resin component are aromatic solvents and esters, preferably mixtures of these solvents.

Examples of aromatic solvents are benzene, toluene, xylene, ethylbenzene, and mixtures thereof. Preferred aromatic solvents are mixed solvents that have an aromatic content of at least 90% and a boiling point range of 148 degrees Celsius to 232 degrees Celsius. Examples of esters which are preferred with the aromatic solvents are PM acetate, dibasic esters, cellosolve acetate, butyl cellosolve, butyl carbitol, diacetone alcohol, and the like. Preferably used as the organic solvent are mixtures of esters and aromatic solvents in a weight ratio of aromatic solvent to ester of from 3:1 to 1:1, preferably from 2.0:1.0 to 1.5:1.0.

The isocyanate hardener component of the binder composition is a liquid polyisocyanate having a functionality of two or more, preferably 2.6–2.8. It may be aliphatic, cycloaliphatic, aromatic, or a hybrid polyisocyanate. Mixtures of such polyisocyanates may be used. Optional ingredients such as a benchlife extender may also be used in the isocyanate hardener component.

Representative examples of polyisocyanates which can be used are aliphatic polyisocyanates such as hexamethylene diisocyanate, alicyclic polyisocyanates such as 4,4'dicyclohexylmethane diisocyanate, and aromatic polyisocyanates such as 2,4 and 2,6-toluene diisocyanate, diphenylmethane diisocyanate, and dimethyl derivates thereof. Other examples of suitable polyisocyanates are 1,5-naphthalene diisocyanate, triphenylmethane triisocyanate, xylylene diisocyanate, and the methyl derivates thereof, polymethylenepolyphenyl isocyanates, chlorophenylene-2,4-diisocyanate, and the like.

The polyisocyanates are used in sufficient concentrations to cause the curing of the phenolic resin in the presence of the liquid amine curing catalyst. In general, the isocyanate ratio of the polyisocyanate to the hydroxyl of the phenolic resin is from 1.1:0.90 to 0.90 to 1.1, preferably about 1.0:1.0. As was mentioned previously it not preferred to use a solvent with the organic polyisocyanate. However, if one chooses to use one, the solvent should not exceed 15 percent of the total weight of the isocyanate component.

Those skilled in the art will know how to select specific solvents for the polyisocyanate component if one is used. It is known that the difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanate. Aromatic solvents, although compatible with the polyisocyanates, are less compatible with the phenolic resins. It is, therefore, preferred to employ combinations of solvents in the polyisocyanate component and particularly combinations of aromatic and polar solvents. Suitable aromatic solvents are benzene, toluene, xylene, ethylbenzene, and mixtures thereof. Preferred aromatic solvents are mixed solvents that have an aromatic content of at least 90% and a boiling point range of 138 degrees Centigrade to 232 degrees Centigrade.

The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosolve, butyl Carbitol, diacetone alcohol, and "Texanol".

The binder compositions are preferably made available as a three component system comprising the phenolic resin component, amine catalyst, and the polyisocyanate component in a separate package. In the no-bake process, the phenolic resin component and catalyst are first mixed with the sand and then the polyisocyanate component is added to form the molding mix. Methods of distributing the binder on the aggregate particles are well-known to those skilled in the art. The mix can, optionally, contain other ingredients such as iron oxide, ground flax fibers, wood cereals, pitch, refractory flours, and the like.

When preparing an ordinary sand-type foundry shape, the aggregate employed has a particle size large enough to provide sufficient porosity in the foundry shape to permit escape of volatiles from the shape during the casting operation. The term "ordinary sand-type foundry shapes," as used herein, refers to foundry shapes which have sufficient porosity to permit escape of volatiles from it during the casting operation.

Generally, at least about 80% and preferably about 90% by weight of aggregate employed for foundry shapes has an average particle size no smaller than about 0.1 mm. The aggregate for foundry shapes preferably has an average particle size between about 0.1 mm and about 0.25 mm. The preferred aggregate employed for ordinary foundry shapes is silica wherein at least about 70 weight percent and preferably at least about 85 weight percent of the sand is silica. Other suitable aggregate materials include zircon, olivine, aluminosilicate, sand, chromite sand, and the like.

When preparing a shape for precision casting, the predominant portion and generally at least about 80% of the aggregate has an average particle size no larger than 0.1 mm and preferably between about 0.04 and 0.075 mm. Preferably at least about 90% by weight of the aggregate for precision casting applications has a particle size no larger than 0.1 mm and preferably between 0.04 mm and 0.075 mm. The preferred aggregates employed for precision casting applications are fused quartz, zircon sands, magnesium silicate sands such as olivine, and aluminosilicate sands.

When preparing a refractory such as a ceramic the predominant portion and at least 80 weight percent of the aggregate employed has an average particle size under 0.075 mm and preferably no smaller than 0.04 mm. Preferably at least about 90% by weight of the aggregate for a refractory has an average particle size under 0.075 mm and preferably no smaller than 0.04 mm. The aggregate employed in the preparation of refractories must be capable of withstanding the curing temperatures such as above about 815 degrees Celsius which are needed to cause sintering for utilization. Examples of some suitable aggregate employed for preparing refractories include the ceramics such as refractory oxides, carbides, nitrides, and silicides such as aluminum oxide, lead oxide, chromic oxide, zirconium oxide, silica, silicon carbide, titanium nitride, boron nitride, molybdenum disilicide, and carbonaceous material such as graphite. Mixtures of the aggregate can also be used, when desired, including mixtures of metals and ceramics.

Examples of some abrasive grains for preparing abrasive articles include aluminum oxide, silicon carbide, boron carbide, corundum, garnet, emery, and mixtures thereof. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic fillers has an average particle size no greater than 0.075 mm. It is most preferred that at least about 95% of the inorganic filler has an average particle size no greater than 0.075 mm. Some inorganic fillers include cryolite, fluorospar, silica, and the like. When an inorganic filler is employed along with the abrasive grit, it is generally present in amounts from about 1% to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate.

In molding compositions, the aggregate constitutes the major constituent and the binder constitutes a relatively minor amount. In ordinary sand type foundry applications, the amount of binder is generally no greater than about 10% by weight and frequently within the range of about 0.5% to about 7% by weight based upon the weight of the aggregate. Most often, the binder content ranges from about 0.6% to about 5% by weight based upon the weight of the aggregate in ordinary sand-type foundry shapes.

In molds and cores for precision casting applications, the amount of binder is generally no greater than about 40% by weight and frequently within the range of about 5% to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

Although the aggregate employed is preferably dry, moisture of up to about 1 weight percent based on the weight of the sand can be tolerated. This is particularly true if the solvent employed is non-water-miscible or if an excess of the polyisocyanate necessary for curing is employed since such excess polyisocyanate will react with the water.

The liquid amine catalyst employed in the compositions of the present invention is a base having a $pK_b$ value in the range of about 7 to about 11. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms. Preferred materials are heterocyclic compounds containing at least one nitrogen atom in the ring structure. Specific examples of bases which have $pK_b$ values within the necessary range include 4-alkyl pyridines wherein the alkyl group has from one to four carbon atoms, isoquinoline, arylpyridines such as phenyl pyridine, pyridine, acridine, 2-methoxypyridine, pyridazine, 3-chloro pyridine, quinoline, N-methyl imidazole, 4,4-dipyridine, phenylpropyl pyridine, 1-methylbenzimidazole, and 1,4-thiazine. Preferably used are imidazoles such as N-methyl- or N-ethyl imidazole.

In view of the varying catalytic activity and varying catalytic effect desired, catalyst concentrations will vary widely. In general the lower the $pK_b$ value is, the shorter will be the bench life of the composition and the faster, more complete will be the cure. Solvents and any acidity present in added ingredients such as sand may affect the catalytic activity. In general, however, catalyst concentrations will range from 0.01 to 10 percent by weight of the phenolic resin.

A valuable additive to the binder compositions of the present invention in certain types of sand is a silane such as those having the general formula:

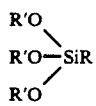

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. The aforesaid silane, when employed in concentrations of 0.1% to 2%, based on the phenolic binder and hardener, improves the humidity resistance of the system.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta(aminoethyl)-gamma-aminopropyltrimethoxy silane); and Union Carbide A-1160 (Ureido-silane).

EXAMPLES

The examples which follow will illustrate specific embodiments of the invention. These examples along with the written description will enable one skilled in the art to practice the invention. It is contemplated that many equivalent embodiments of the invention will be operable besides these specifically disclosed.

In examples 1-7, the foundry samples are cured by the no-bake process by using a thirty percent solution of N-methyl imidazole dissolved in HI-SOL® 10 aromatic hydrocarbon solvent as the catalyst in amount of 2.0 weight percent based upon the weight of the resin component. The catalyst is added to the resin component (RC) before the isocyanate component (IC) is added to the sand. The binder is used in an amount of 1.5 weight percent based upon the weight of the sand (Wedron 540).

The isocyanate component (IC) used in the examples consisted of a polymethylene polyphenyl isocyanate having an average functionality of 2.6 and HI-SOL®15 aromatic solvent in an amount as specified in Table I.

The phenolic resin component consisted of a phenolic resole benzylic ether resin such as those described in U.S. Pat. No. 3,485,797, except that it has been modified with methanol, and a co-solvent mixture consisting of HI-SOL 15 and aromatic solvent and PM acetate in a weight ratio of aromatic solvent to ester of 2:1, and such that the weight ratio of resin to co-solvent mixture is 40:60.

The comparative examples use a commercially available and successful no-bake polyurethane-forming foundry binder known as PEP SET® foundry binder. The resin component used in the comparison examples was PEP SET® 1600 binder and the isocyanate component used was PEP SET 2600 binder, both of which are the major components of various no-bake binder systems sold by Ashland Chemical, Inc. The binder of comparative example A was cured with 25 percent solution of 4-phenyl propyl pyridine in an aromatic hydrocarbon solvent and was used in an amount of 1.8 weight percent based upon the weight of the resin component. The binder of Comparative Example B was cured with the N-methyl imidazole solution in an amount of 1.7 weight percent based upon the weight of the resin component.

The resulting foundry mixes were formed into standard AFS tensile test samples according to standard procedures. Measuring the tensile strength of the dog bone samples enables one to predict how the mixture of said and polyurethane-forming binder will work in actual foundry operations.

In the examples which follow, the tensile strengths were measured 30 minutes, 1 hour, 3 hours and 24 hours after curing at ambient conditions in closed containers. The dog bone samples that were tested 24 hours after curing were stored at a relative humidity of 50% and a temperature of 25° C. They were also measured 24 hours after curing after being exposed to a relative humidity (RH) of 100%. Tensile strengths at these times are given in Table I.

The data in TABLE I indicate that the binders described in examples 1-7 produced foundry shapes with improved tensile strengths under the test conditions when compared to the commercially successful PEP SET® foundry binders.

TABLE I

| Example | IC/weight percent solvent | Ratio RC/IC | Tensile Properties (PSI) | | | | |
|---|---|---|---|---|---|---|---|
| | | | 30 Min | 1 Hr | 3 Hr | 24 Hr | 24 Hr @ 100% RH |
| Comparison A | 27 | 55:45 | 146 | 204 | 253 | 318 | 72 |
| 1 | 0 | 70:30 | 167 | 268 | 308 | 412 | 55 |
| 2 | 5 | 70:30 | 198 | 244 | 306 | 399 | 50 |
| 3 | 10 | 70:30 | 168 | 229 | 281 | 382 | 64 |
| 4 | 0 | 65:35 | 163 | 280 | 294 | 399 | 82 |
| 5 | 0 | 75:25 | 195 | 260 | 307 | 398 | 61 |
| Comparison B | 27 | 55:45 | 105 | 143 | 168 | 211 | 46 |
| 6 | 0 | 70:30 | 179 | 239 | 330 | 413 | 59 |

TABLE I-continued

| Example | IC/weight percent solvent | Ratio RC/IC | Tensile Properties (PSI) | | | | |
|---|---|---|---|---|---|---|---|
| | | | 30 Min | 1 Hr | 3 Hr | 24 Hr | 24 Hr @ 100% RH |
| 7 | 0 | 70:30 | 165 | 233 | 271 | 247 | 58 |

We claim:

1. A no-bake polyurethane foundry binder comprising in admixture
   (a) a phenolic resin component comprising a phenolic resole resin and a co-solvent mixture comprising an ester solvent and an aromatic solvent;
   (b) an isocyanate component comprising an organic polyisocyanate and 0–15 weight percent of a solvent, said weight percent based upon the total weight of the isocyanate component, such that the weight ratio of (a) to
   (b) is 65:35 to 75:25; and
   (c) a catalytically effective amount of a liquid amine catalyst.

2. The binder of claim 1 wherein the phenolic resole resin of the phenolic resin component of the polyurethane-forming binder composition comprises a phenolic resole resin prepared by reacting an aldehyde with a phenol such that the molar ratio of aldehyde to phenol is 1.1:1.0 to 3.0:1.0.

3. The binder of claim 2 wherein the phenolic resin of the phenolic resin component of the polyurethane-forming binder composition is prepared with a divalent metal catalyst.

4. The binder of claim 3 wherein the phenolic resin is an alkoxy-modified phenolic resin and the phenol used to prepare said resin is selected from the group consisting of phenol, o-cresol, m-cresol, and mixtures thereof.

5. The binder of claim 4 wherein the weight ratio of aromatic solvent to ester solvent in the phenolic resin component is 3:1 to 1:1.

6. The binder of claim 5 wherein the co-solvents of the phenolic resin component are present in an amount of 40–60 weight percent based upon the total weight of the phenolic resin component.

7. The binder of claim 6 wherein the ester co-solvent of the phenolic resin component is PM acetate.

8. The binder of claim 7 wherein the polyurethane-forming binder composition has a ratio of hydroxyl groups of the phenolic resin to isocyanate groups of the polyisocyanate of 1.1:0.9 to 0.9:1.1.

9. The binder claim 8 wherein the weight ratio of resin component to isocyanate component is about 70:30 and the weight ratio of the aromatic solvent to ester solvent of the resin component is about 3:1.

10. A no-bake polyurethane-forming foundry binder, curable with a catalytically effective amount of an amine catalyst, comprising as separate components:
    (a) a phenolic resin component comprising a phenolic resole resin and a co-solvent mixture comprising an ester solvent and an aromatic solvent; and
    (b) an isocyanate component comprising an organic polyisocyanate and 0–15 weight percent of a solvent, said weight percent based upon the total weight of the isocyanate component,
    such that the weight ratio of (a) to (b) is 65:35 to 75:25.

11. The binder of claim 10 wherein the phenolic resole resin of the phenolic resin component of the polyurethane-forming binder composition comprises a phenolic resole resin prepared by reacting an aldehyde with a phenol such that the molar ratio of aldehyde to phenol is 1.1:1.0 to 3.0:1.0.

12. The binder of claim 11 wherein the phenolic resin of the phenolic resin component of the polyurethane-forming binder composition is prepared with a divalent metal catalyst.

13. The binder of claim 12 wherein the phenolic resin is an alkoxy modified phenolic resin and the phenol used to prepare said resin is selected from the group consisting of phenol, o-cresol, m-cresol, and mixtures thereof.

14. The binder of claim 13 wherein the weight ratio of aromatic solvent to ester solvent in the phenolic resin component is 3:1 to 1:1.

15. The binder of claim 14 wherein the co-solvents of the phenolic resin component are present in an amount of 40–60 weight percent based upon the total weight of the phenolic resin component.

16. The binder of claim 15 wherein the ester co-solvent of the phenolic resin component is PM acetate.

17. The binder of claim 16 wherein the polyurethane-forming binder composition has a ratio of hydroxyl groups of the phenolic resin to isocyanate groups of the polyisocyanate of 1.1:0.9 to 0.9:1.1.

18. The binder claim 17 wherein the weight ratio of resin component to isocyanate component is about 70:30 and the weight ratio of the aromatic solvent to ester solvent of the resin component is about 3:1.

19. A foundry molding composition comprising:
    a foundry aggregate with a bonding amount of up to about 10% by weight, based upon the weight of the aggregate, of the foundry binder of claim 10.

20. A foundry molding composition comprising:
    a foundry aggregate with a bonding amount of up to about 10% by weight, based upon the weight of the aggregate, of the foundry binder of claim 11.

21. A foundry molding composition comprising:
    a foundry aggregate with a bonding amount of up to about 10% by weight, based upon the weight of the aggregate, of the foundry binder of claim 12.

22. A foundry molding composition comprising:
    a foundry aggregate with a bonding amount of up to about 10% by weight, based upon the weight of the aggregate, of the foundry binder of claim 13.

23. A foundry molding composition comprising:
    a foundry aggregate with a bonding amount of up to about 10% by weight, based upon the weight of the aggregate, of the foundry binder of claim 14.

24. A foundry molding composition comprising:
    a foundry aggregate with a bonding amount of up to about 10% by weight, based upon the weight of the aggregate, of the foundry binder of claim 15.

25. A foundry molding composition comprising:
    a foundry aggregate with a bonding amount of up to about 10% by weight, based upon the weight of the aggregate, of the foundry binder of claim 16.

26. A foundry molding composition comprising:
    a foundry aggregate with a bonding amount of up to about 10% by weight, based upon the weight of the aggregate, of the foundry binder of claim 18.

27. A no-bake process for the fabrication of foundry shapes comprising:

(a) mixing a foundry aggregate with a bonding amount of up to about 10% by weight, based upon the weight of the aggregate, of a binder composition comprising:
  (i) a phenolic resin component comprising a phenolic resole resin and a co-solvent mixture comprising an ester solvent and an aromatic solvent; and
  (ii) an isocyanate component comprising an organic polyisocyanate and 0-15 weight percent of a solvent, said weight percent based upon the total weight of the isocyanate component,
such that the weight ratio of (i) to (ii) is 65:35 to 75:25,
  (iii) a catalytically effective amount of a liquid tertiary amine catalyst;
(b) introducing the foundry mix obtained from step (a) into a pattern;
(c) allowing the foundry mix to harden in the pattern until it becomes self-supporting; and
(d) thereafter removing the shaped foundry mix of step (c) from the pattern and allowing it to further cure, thereby obtaining a hard, solid, cured foundry shape.

28. The process of claim 27 wherein the phenolic resole resin component and liquid tertiary amine catalyst are mixed with the aggregate prior to mixing the polyisocyanate hardener component with the sand.

29. The process of claim 28 wherein the binder composition is about 0.6 to 5.0 weight percent based upon the weight of the aggregate.

30. The process of claim 29 wherein the phenolic resole resin of the phenolic resin component of the polyurethane-forming binder composition comprises a phenolic resole prepared by reacting an aldehyde with a phenol such that the molar ratio of aldehyde to phenol is 1.1:1.0 to 3.0:1.0.

31. The process of claim 30 wherein the phenolic resin of the phenolic resin component of the polyurethane-forming binder composition is prepared with a divalent metal catalyst.

32. The process of claim 31 wherein the phenolic resin is an alkoxy modified phenolic resin and the phenol used to prepare said resin is selected from the group consisting of phenol, o-cresol, m-cresol, and mixtures thereof.

33. The process of claim 32 wherein the weight ratio of aromatic solvent to ester solvent in the phenolic resin component is 3:1 to 1:1.

34. The process of claim 33 wherein the co-solvents of the phenolic resin component are present in an amount of 40-60 weight percent based upon the total weight of the phenolic resin component.

35. The process of claim 34 wherein the ester co-solvent of the phenolic resin component is PM acetate.

36. The process of claim 35 wherein the polyurethane-forming binder composition has a ratio of hydroxyl groups of the phenolic resin to isocyanate groups of the polyisocyanate of 1.1:0.9 to 0.9:1.1.

37. The process claim 36 wherein the weight ratio of resin component to isocyanate component is about 70:30 and the weight ratio of the aromatic solvent to ester solvent of the resin component is about 3:1.

38. The process of claim 37 wherein the amine catalyst is vinyl imidazole.

39. A process for casting a metal which comprises:
  (a) fabricating a shape in accordance with claim 27;
  (b) pouring said metal while in the liquid state into and around said shape;
  (c) allowing said metal to cool and solidify; and
  (d) then separating the molded article.

40. A process for casting a metal which comprises:
  (a) fabricating a shape in accordance with claim 32;
  (b) pouring said metal while in the liquid state into and around said shape;
  (c) allowing said metal to cool and solidify; and
  (d) then separating the molded article.

41. A process for casting a metal which comprises:
  (a) fabricating a shape in accordance with claim 35;
  (b) pouring said metal while in the liquid state into and around said shape;
  (c) allowing said metal to cool and solidify; and
  (d) then separating the molded article.

42. A process for casting a metal which comprises:
  (a) fabricating a shape in accordance with claim 37;
  (b) pouring said metal while in the liquid state into and around said shape;
  (c) allowing said metal to cool and solidify; and
  (d) then separating the molded article.

* * * * *